US005694499A

United States Patent [19]
Tillerot et al.

[11] Patent Number: 5,694,499
[45] Date of Patent: Dec. 2, 1997

[54] OPTICAL CROSSCONNECT

[75] Inventors: François Tillerot, Spern ar bleiz; René Auffret, Louannec; Georges Claveau, Camlez, all of France

[73] Assignee: France Telecom, Paris, France

[21] Appl. No.: 511,899

[22] Filed: Aug. 7, 1995

[30] Foreign Application Priority Data

Aug. 10, 1994 [FR] France ................... 94 09900

[51] Int. Cl.$^6$ ............................................. G02B 6/28
[52] U.S. Cl. ............................................. 385/24
[58] Field of Search ................... 385/24, 147; 359/115, 359/116, 117, 118, 124

[56] References Cited

FOREIGN PATENT DOCUMENTS

| 0 494 831 | 7/1992 | European Pat. Off. . | |
| 0494831 | 7/1992 | European Pat. Off. | 385/24 |
| 0 548 453 | 6/1993 | European Pat. Off. . | |
| 0548453 | 6/1993 | European Pat. Off. | 385/24 |

OTHER PUBLICATIONS

Proceedings, 19th European Conference on Optical Communication, vol. 3, pp. 60–67, Sep. 12–16, 1993, K. Stukjaer, et al., "Semiconductor Optical Amplifiers as Linear Amplifiers, Gates and Wavelength Converters".

Proceedings, 19th European Conference on Optical Communication, vol. 3, pp. 73–76, Sep. 12–16, 1993, B. Mikkelsen, et al., "20GBIT/S Polarisation Insensitive Wavelength Conversion in Semiconductor Optical Amplifiers".

International Switching Symposium, vol. 3, pp. 21–26, May 28–Jun. 1, 1990, A.M. Hill, et al., "A Distributed Wavelength Switching Architecture for the TPON Local Network".

Electronic Letters, vol. 28, No. 13, pp. 1268–1270, Jun. 18, 1992, H. Obara, et al., "Star Coupler Based WDM Switch Employing Tunable Devices With Reduced Tunability Range".

Proceedings of the IEEE, vol. 81, No. 11, pp. 1624–1631, Nov. 1993, C. Baack, et al., "Photonics in Future Telecommunications".

Primary Examiner—Akm E. Ullah
Attorney, Agent, or Firm—Oblon, Spivak, McClelland, Maier & Neustadt, P.C.

[57] ABSTRACT

An optical crossconnect includes optical elements (D1 ... DM) for wavelength demultiplexing of optical signals and elements (MT) for optically processing the demultiplexed signals which give each optical signal a specific wavelength and bring to one of the outputs (S1 ... SM) the signal with the specific wavelength under the control of a management unit (G). Such an optical crossconnect may find particular application in telecommunication networks.

9 Claims, 4 Drawing Sheets

OPTICAL CROSSCONNECT

BACKGROUND OF THE INVENTION

The present invention concerns an optical crossconnect.

FIELD OF THE INVENTION

The invention applies in particular to optical telecommunication networks and more particularly to interconnected loop networks or lattice networks.

BACKGROUND OF THE INVENTION

The most simple known method for managing an optical telecommunications network of consists of allocating a fixed wavelength to each pairing (sender, recipient).

This is diagrammatically shown in FIG. 1 illustrating three nodes A1, A2, A3 of such a network and which are connected by optical fibers 2.

Let us mention the fact that a node is a place where items of information are inserted and/or extracted from the network.

In the network of FIG. 1, a wavelength λij is allocated to the communications from the node Ai to the node Aj where the numbers i and j take any one of the values 1, 2, 3.

Each node of the network of FIG. 1 can transmit towards any other node, which uses at the time of receiving a set of suitable optical filters.

This management method needs to have a large number of components and, with this method, the passband is not distributed so as to be able to be reconfigured.

A choice can thus be made for managing the traffic of communications within the network by allocating a wavelength to the communications between two nodes of the network.

In this case a continuity of the "path" of this wavelength is ensured during the carrying of information.

It is then necessary to choose a wavelength which avoids restraint (in the sense where two items of information can be carded on the same wavelength on a given link, that is on a given optical fiber linking two nodes of the network).

In the case where there is only a limited number of wavelengths, restraint appears rapidly if certain links of the network are overloaded.

As regards the nodes, the use of devices (known as "wavelength converters" or "wavelength shifters" in articles drafted in English) are able to render optical telecommunication networks more effective.

These fully optical devices are described in detail in the following documents:

(1) Broadband Optical Wavelength Shifter, B. Glance and al., CLEO '92, Anaheim, postdeadline paper CPD27, May 1992.

(2) Semiconductor Optical Amplifiers as Linear Amplifiers, Gates and Wavelength Converters, K. Stubkjaer and at., ECOC '93, Montreux, invited paper TUC5.1, September 1993.

(3) 20 Gbit/s Polarization insensitive Wavelength Conversion in Semiconductor Optical Amplifiers, B. Mikkelsen and al., ECOC '93, Montreux, postdeadline paper ThP12.6, September 1993.

FIG. 2 diagramatically illustrates a fully optical shifter T.

This shifter receives in its input a modulated optical signal S with a wavelength λ1 and supplies at its output the signal S whose wavelength λ2 differs from λ1.

There are fixed shifters, that is shifters which always supply the same output wavelength.

Other known types of shifters are on the contrary wavelength-tunable.

This is the case of the shifter shown on FIG. 2 which, according to a control signal CM, is able to convert a wavelength into another wavelength selected from a set of wavelengths.

There are various techniques for converting wavelengths making it possible to adjust the output wavelength by an electric control device or an optical control device.

The document also gives details of:

(4) Optical crossconnect, E. Le Coquil and A. Hamel, French patent application n° 91 14227 of 19 Nov. 1991= FR-A2683962, an optical crossconnect which uses optoelectronic shifters.

This known type of optical crossconnect has the drawback of not being fully optical.

In effect, the passage from an optical signal to an electronic signal breaks up the continuity of the signal through the optical crossconnect.

There are also other optical crossconnects comprising switching matrixes (spatial switches).

However, the other known optical crossconnects have a large number of drawbacks linked to the characteristics of the components they include.

In particular, these other known optical crossconnects have the drawback of being dependent on the polarization state of incident luminous signals.

SUMMARY OF THE INVENTION

The present invention offers an optical crossconnect which does have these drawbacks.

The optical crossconnect of the invention maintains the optical continuity of the incident luminous signals and does not depend on the polarization state of these signals.

More specifically, the present invention concerns an optical crossconnect, wherein it comprises:

M wavelength demultiplexing optical means, M being a whole number equal at least to 2, each demultiplexing optical means having firstly an input for receiving the input optical signals whose wavelengths are distinct from each other and selected from a first group of N wavelengths distinct from each other, N being a whole number equal at least to 2, and secondly N output channels, this demultiplexing device being able to supply the demultiplexed optical signals on said output channels.

optical means for processing these demultiplexed signals and comprising optical coupling means, a first set of optical filtering means, a second set of fully optical wavelength converting means and a plurality of outlets, the means of at least one of the first and second sets being wavelength-tunable, and management means provided to control the wavelength-tunable means, and wherein the optical coupling means, the first set of optical filtering means and the second set of wavelength conversion means are provided to give each input optical signal a specific wavelength selected from a second group of N wavelengths distinct from each other and bring to one of the outputs this input optical signal with said specific wavelength under the control of the management means.

The optical crossconnect of the present invention uses fully optical shifters. It is applicable, as shall be seen subsequently, to various structures of interconnection networks.

The optical crossconnect of the invention allows for the use of a minimum number of wavelengths and thus a minimum number of optical components whilst maintaining the optical continuity of a signal in the entire network.

According to a first particular embodiment of the optical crossconnect of the invention, the optical processing means include N optical processing sets, each optical processing set including:

a main optical coupler with M inputs and M outlets,

M auxiliary optical couplers each including one input and M outputs,

M optical output couplers respectively associated with M auxiliary optical couplers and each including M inputs and one output, and M×M optical filters and M×M wavelength converters, at least the optical filters being wavelength-tunable, in the optical processing set of row p for any number p ranging from 1 to N, the input of row i of the main coupler for any number i ranging from 1 to M is connected to the outgoing channel of row j of the demultiplexing device of row i where the number j cyclically traverses all the numbers 1 to M from the number p, the outputs of the main coupler being respectively connected to the inputs of the auxiliary couplers and each output of each auxiliary coupler being connected to one input of the associated output coupler by means of one of the optical filters followed by one of the wavelength converters.

According to one first particular embodiment, each wavelength converter is able to convert to a fixed wavelength the wavelength of an incident optical signal, this fixed wavelength being selected from the second group of N wavelengths.

According to a second particular embodiment, each wavelength converter is wavelength-tunable and able to convert the wavelength of an incident optical signal into any one of the wavelengths of the second group of N wavelengths.

The first and second groups of N wavelengths may be identical.

On the other hand, the wavelengths of the second group of N wavelengths may be different from the wavelengths of the first group of N wavelengths.

According to a second particular embodiment of the optical crossconnect of the invention, the optical coupling means include a main optical coupler with M×N inputs and M×N outputs and M outgoing optical couplers with N inputs and one output, the number of the optical filtering means being M×N and respectively connecting the outputs of the main optical coupler to the inputs of the outgoing optical couplers, the outputs of the latter constituting the outputs of the optical processing means, and the number of the wavelength conversion means being M×N and respectively connecting the outgoing channels of the demultiplexing means to the inputs of the main optical coupler.

In this case, in one particular first embodiment, the wavelength conversion means are wavelength-tunable and the optical filtering means are fixed.

In a second particular embodiment, the wavelength conversion means are fixed and the optical filtering means are wavelength-tunable.

BRIEF DESCRIPTION OF THE DRAWINGS

The present invention shall be more readily understood from a reading of the definition of embodiment examples given hereafter solely by way of illustration and being non-restrictive with reference to the accompanying drawings in which.

DETAILED DESCRIPTION OF THE PREFERRED EMBODIMENTS

Figure 1:
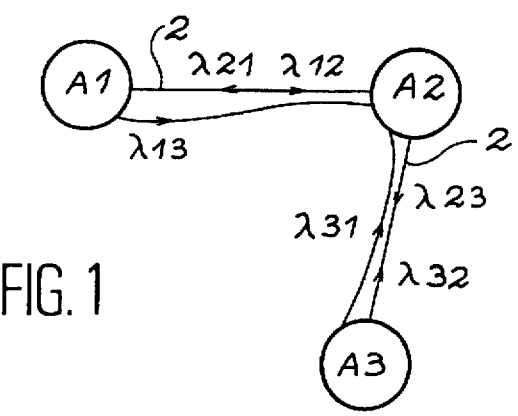
FIG. 1, already described, diagrammatically shows the nodes of a network of optical telecommunications, FIG. 2, already described, diagrammatically shows the wavelength-tunable shifter, FIG. 3 diagrammatically shows a loop optical telecommunications network.
Figure 2:
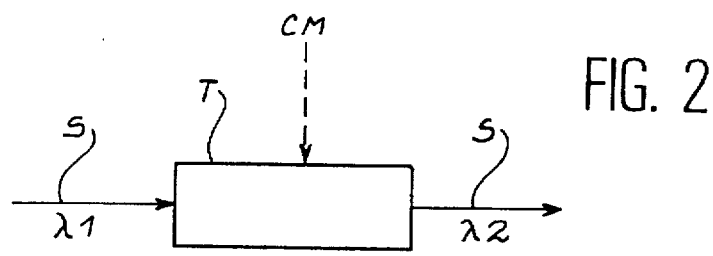
Figure 3:
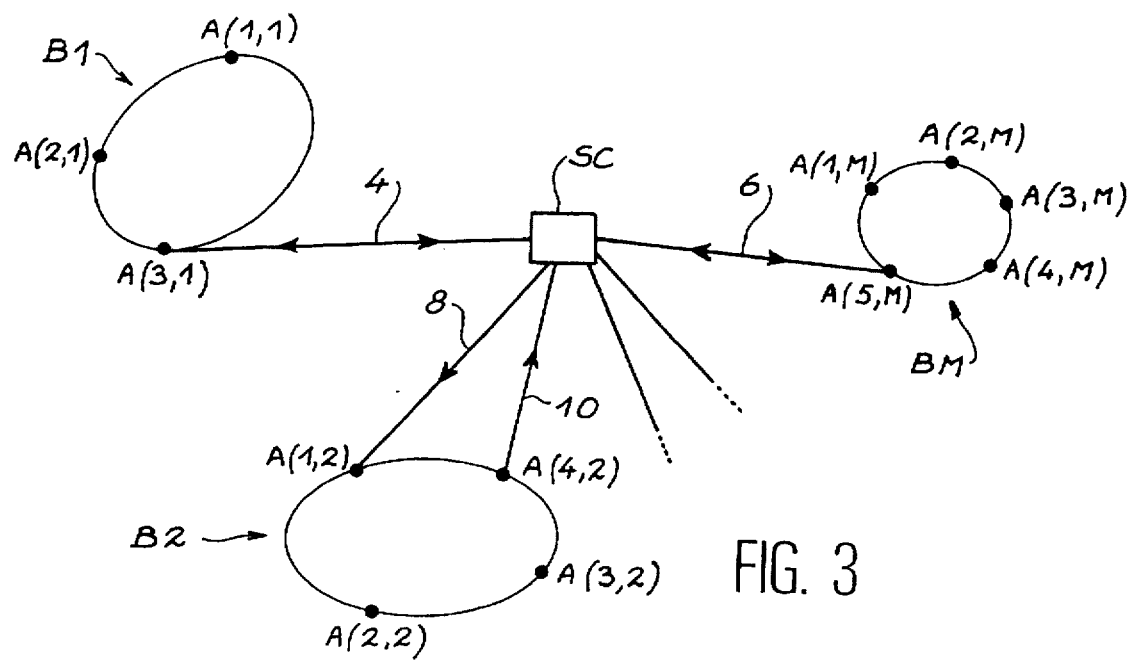

FIG. 3 diagrammatically shows an optical telecommunications network including a set of M <<multicolored>> loops where M is a whole number equal at least to 2.

Each of these loops includes a certain number of nodes, each node being able to transmit and/or receive information from the other nodes of the network.

Each <<multicolored>> loop has the physical topology of a loop in which each node has a wavelength (channel) for transmitting and receiving information.

The network of FIG. 3 is a centralized management network and includes a central station SC for this management.

Each loop is connected bidirectionally to this central station SC.

Each node of the network A(j, i) is noted, as well as the index i corresponding to the number of the loop in which this node is located and the index j corresponding to the wavelength λj associated with this node.

For example, in FIG. 3 the loop B1 is shown including three nodes A(1, 1), A(2, 1) and A(3, 1).

FIG. 3 also shows a link 4 (optical fiber) which connects the central station SC to a node of the loop BI and on which the communications are bidirectional.

The same applies to the loop BM, the corresponding link having the reference 6.

In the case of the loop B2, an optical fiber 8 routes the communications from the central station SC as far as the loop B2, whereas another optical fiber 10 routes the communications of this loop B2 as far as the central station SC.

The number of nodes of the loop i is noted Ni, the index i assuming any one of the values from 1 to M.

The largest of the numbers Ni is noted N where i varies from 1 to M, N being the number of wavelengths allowing the entire network to be managed (N is a whole number equal at least to 2).

For transmission and receiving, the wavelength is noted λi and allocated to the node A(i,j) of the loop Bj.

The central station SC includes an optical crossconnect conforming to the invention.

Figure 4:
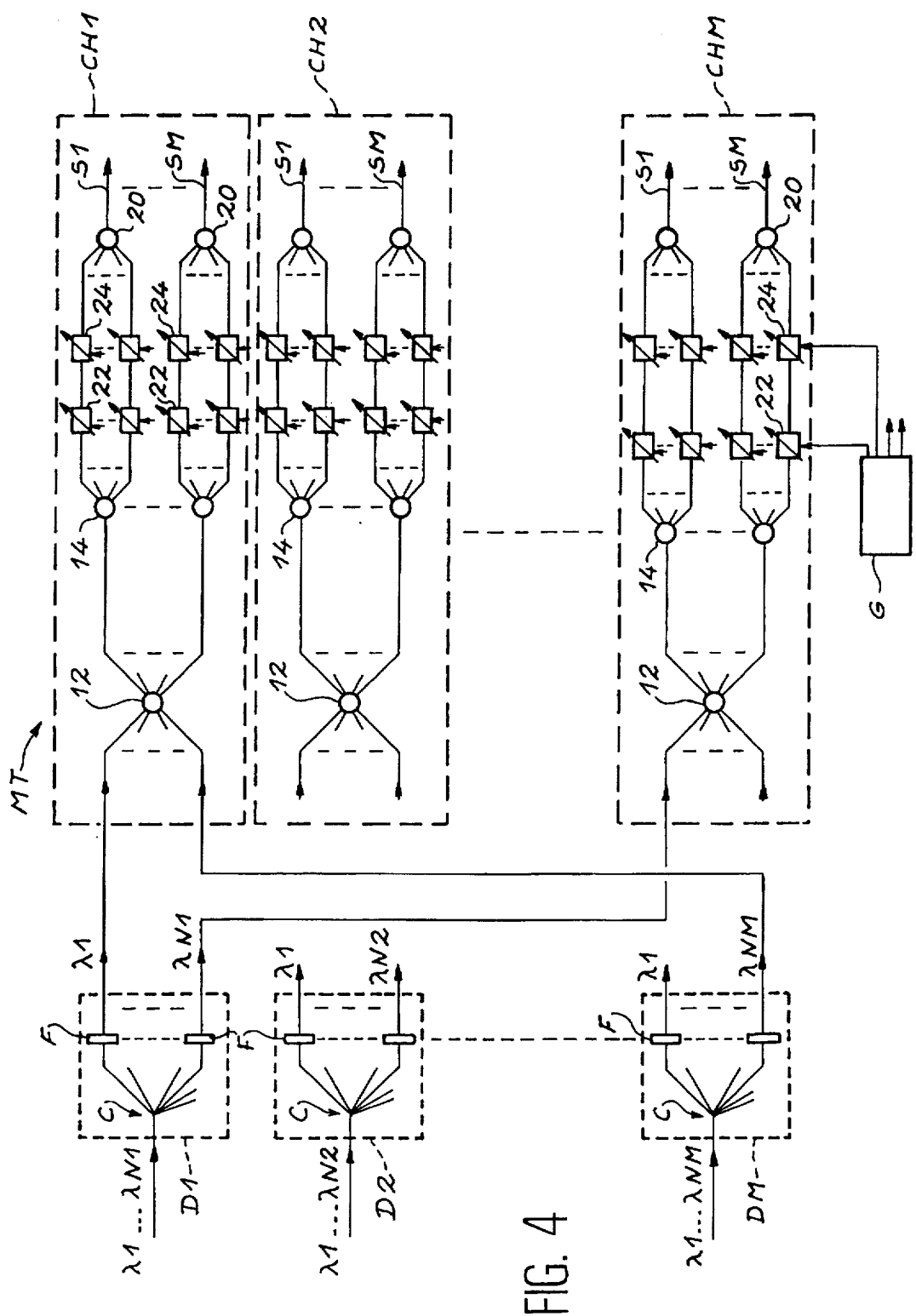
FIG. 4 is a diagrammatic view of a first particular embodiment of the fully optical crossconnect of the present invention, FIGS. 5A to 5E diagrammatically show the functioning of an optical crossconnect conforming to the invention, FIG. 6 diagrammatically illustrates a lattice optical telecommunications network.

FIG. 4 diagrammatically shows a particular embodiment of the optical crossconnect of the invention able to be used in this central station SC.

The optical crossconnect of the invention diagrammatically shown in FIG. 4 includes M wavelength demultiplexers D1, D2, ..., DM each of which has one input and thus in all M inputs which constitute the inputs of the optical crossconnect.

These inputs are respectively associated with the loops, and the demultiplexer Dj (j ranging from 1 to M) which is connected to the loop Bj is able to separate the wavelength signals $\lambda 1, \lambda 2, ..., \lambda Nj$.

The separated signals are available on Nj output channels from the N output channels which the demultiplexer Dj comprises.

Only some of these output channels are shown in FIG. 4.

Each demultiplexer Dj (j ranging from 1 to M) can be embodied with the aid of a coupler C with one input and N outputs and N filters with wavelengths F which respectively only allow the wavelengths $\lambda 1, ..., \lambda N$ to pass.

It is to be noted that, for Nj<N, the output numbers Nj+1 to N of a demultiplexer Dj are not used.

The optical crossconnect of FIG. 4 also includes optical means MT for processing demultiplexed signals.

These optical processing means MT include N optical processing layers or sets referenced CH1, CH2, ..., CHN in FIG. 4.

Each layer includes:

a main optical pairing 12 with M inputs and M outputs,

M auxiliary optical couplers 14 with one input and M outputs, and

M output couplers 20 with M inputs and one output, these couplers 20 being respectively associated with the couplers 14.

The outputs of the coupler 12 are respectively connected to the inputs of the couplers 14.

Each output of each coupler 14 is connected to one input of the coupler 20 associated with this coupler 14 by means of a tunable optical filter 22 followed by a tunable shifter 24.

The light coming out of this output of the coupler 14 thus passes firstly into the filter 22 and then in the shifter 24 before finally arriving at the input of the coupler 20.

Each of the tunable optical filters 22 is able to select a wavelength from the wavelengths $\lambda 1, \lambda 2, ..., \lambda N$ which are used in the optical crossconnect.

Each tunable fully optical shifter 24 is able to convert a wavelength reaching it as a wavelength selected from these wavelengths $\lambda 1, \lambda 2, ..., \lambda N$.

Each of the layers CH1, ..., CHN includes M outputs S1 ... SM respectively constituted by the outputs of the couplers 20 of this layer.

Thus, there are M×N outputs which constitute the outputs of the optical crossconnect of FIG. 4.

The output number i of each of the layers of the optical processing means MT is optically connected to the loop Bi,i ranging from 1 to M.

There now follows an explanation of the optical links between the optical processing means MT and the demultiplexers D1 ... DM of the optical crossconnect of FIG. 4.

To provide more clarity of FIG. 4, only some of these optical links are shown in this figure.

For the layer CH1, the input number 1 of the coupler 12 is connected to the output channel number 1 of the demultiplexer D1, the input number 2 of this coupler 12 is connected to the output channel 2 of the demultiplexer D2, ..., and the input number M of this coupler 12 is connected to the output channel number M of the demultiplexer DM.

For the layer CH2, the input number 1 of this coupler is connected to the output channel number 2 of the demultiplexer D1, the input number 2 of this coupler 12 is connected to the output channel number 3 of the demultiplexer D2, ..., the input number M-1 of this coupler 12 is connected to the output channel M of the demultiplexer DM-1 and the input number M of this coupler 12 is connected to the output channel number 1 of the demultiplexer DM.

For the layer number p, p being a whole number which assumes any value from 1 to N, generally speaking the input number 1 of the corresponding coupler 12 is connected to the output channel p of the demultiplexer D1, the input number 2 of this coupler 12 is connected to the output channel number p+1 of the demultiplexer D2, ..., and the input number M of this coupler 12 is connected to the output channel number p-1 of the demultiplexer DM.

As regards all these optical connections, one moves from one layer to the next layer via a circular permutation of the incoming wavelengths.

The optical crossconnect of FIG. 4 also includes management means G, each of the latter controlling tunable optical filters 22 and each of the tunable shifters 24.

More specifically, with a first node of the network desiring to communicate with a second node of this network, the first node informs the management means G and the latter suitably tunes the filters 22 and the shifters 24 so that the first node is able to communicate with the second node by means of the optical crossconnect.

For example, let us consider an element of information transmitted by a node Ai to the wavelength $\lambda i$, this node being in the loop Bj of the network.

This information arrives at one of the layers of the optical crossconnect.

In this layer, the tunable optical filter corresponding to the recipient op, for example noted Bj1, is tuned on the wavelength $\lambda i$.

The tunable shifter associated with this tunable filter is tuned to the wavelength of the node Ai1 which is the recipient of the information issued from the node Ai and which is located in the loop Bj1.

Figure 5A:
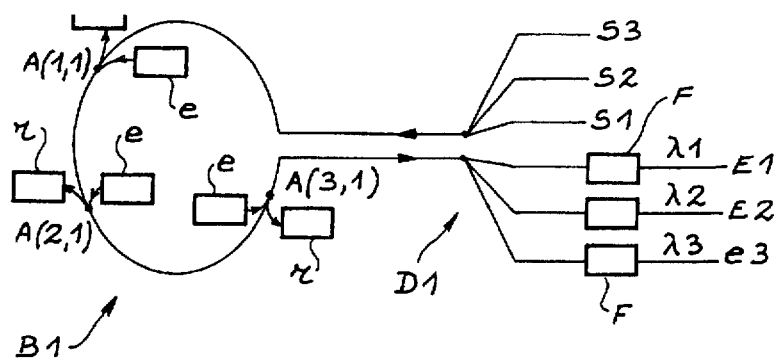
Figure 5B:
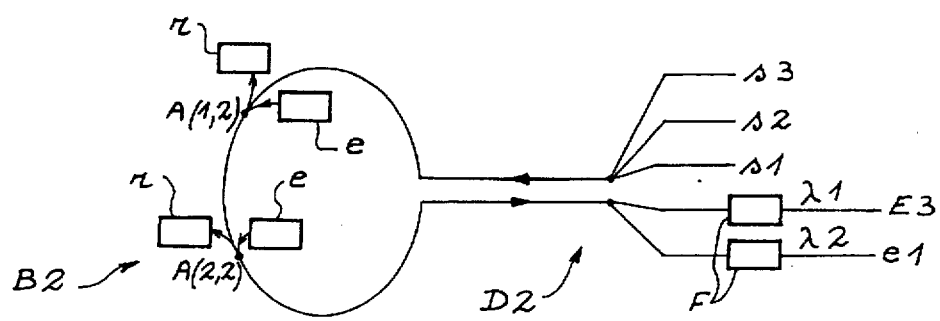

FIGS. 5A to 5E illustrate in more detail the functioning of an optical crossconnect conforming to the invention with two loops (FIG. 5A) and B2 (FIG. 5B).

The loop B1 includes three nodes A (1, 1), A (2, 1) and A (3, 1).

The loop B2 includes two nodes A (1, 2) and A (2, 2).

In this example, three wavelengths $\lambda 1, \lambda 2$ and $\lambda 3$ are used for emitting and receiving information, N being therefore equal to 3 in the present case.

More specifically, the nodes A (1, 1) and A (1, 2) emit and receive information on the wavelength $\lambda 1$.

The nodes A(2, 1) and A(2, 2) emit and receive information on the wavelength $\lambda 2$.

The node A(3, 1) emits and receives information on the wavelength $\lambda 3$.

For each node, the transmitter is noted e and the receiver is noted r.

The number M is equal to 2 in the present case.

Figure 5C:
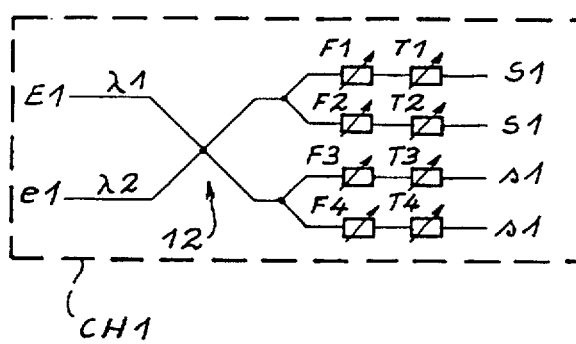
Figure 5D:
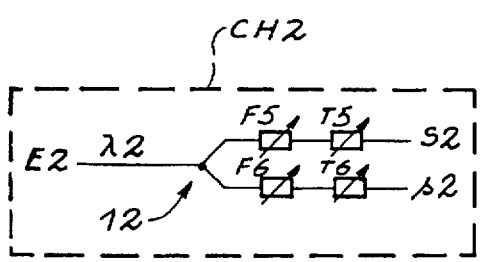
Figure 5E:
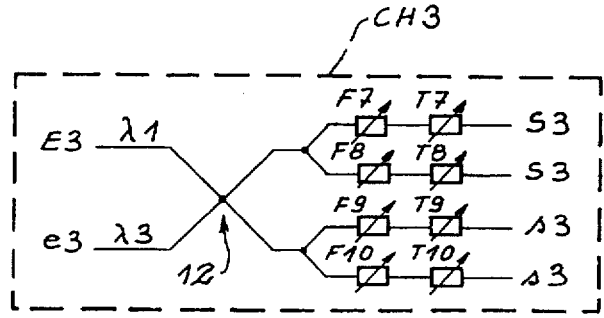

The optical crossconnect here comprises three layers CH1 (FIG. 5C), CH2, (FIG. 5D) and CH3 (FIG. 5E).

FIG. 5A shows a demultiplexing on the wavelengths $\lambda 1$, $\lambda 2$ and $\lambda 3$ and in FIG. 5B, a demultiplexing on the wavelengths $\lambda 1$ and $\lambda 2$.

The references E1, E2, E3, e1 and e3 mark the connections in FIGS. 5A to 5E after these demultiplexings with the three layers of the optical crossconnect.

These FIGS. 5A to 5E also show how the outputs S1, S2, S3, s1, s2 and s3 of these layers are connected to the two loops.

FIG. 5C shows four tunable optical filters F1 to F4 of the layer CH1 which are respectively associated with four tunable shiners T1 to T4 of this layer.

FIG. 5D shows two tunable optical filters F5 and F6 of the layer CH2 which are respectively associated with two tunable shifters T5 and T6 of this layer.

FIGS. 5A to 5E do not show the management means of the optical crossconnect in question.

Moreover, for greater clarity of FIGS. 5A to 5E, the unused elements of these figures (inputs and/or outputs of certain couplers, filters and shifters) have not been shown.

For example, one of the two inputs and one of the two outputs of the coupler 12 of the layer CH2 have been shown.

The third output channel of the demultiplexer D2 (associated with the loop B2) is no longer shown.

Let us assume that the node A (3, 1) sends a message to the node A (2, 2).

This message is transmitted to the wavelength λ3, circulates in the loop B1 and arrives at the optical crossconnect in the layer CH3.

In this layer, it is selected by the filter F9 of the output s3 and then transposed to the wavelength λ2 by the shifter T9.

The signal thus leaves on the output s3 at the wavelength λ2 which corresponds to the node A (2, 2), the second node of the loop B2.

So as to send a message from the node A (1,1) to the node A (2,1), the filter F3 is tuned on λ1 and the shifter T3 on λ2.

So as to send a message from the node A (2,1) to the node A (1, 1), the filter F1 is tuned on λ2 and the shifter T1 on λ1.

So as to send a message from the node A (1,2) to the node A (3,1), the filter F7 is tuned on λ1 and the shifter T7 on λ3.

For a loop network where each node contains for receiving information a wavelength-tunable filter (controlled by the management means), it is possible to use a optical crossconnect simpler than that of FIG. 4 by replacing in the optical crossconnect of the latter the shifters tunable by fixed shifters which are adjusted on fixed wavelengths.

It is also possible to embody another optical crossconnect conforming to the invention in which the filters 22 of FIG. 4 are still tunable on the wavelengths λ1 to λN but the shifters 24 are tunable on wavelengths Λ1 to ΛN differing from the wavelengths λ1 to λN, hence two times more wavelengths than in the case of FIG. 4.

This other optical crossconnect can be used with a loop network in which the nodes emit information on wavelengths selected from the set λ1 to λN and receive information on wavelengths selected from the set Λ1 to ΛN.

This makes it possible to simplify the embodiment of a loop network in which each node is both a transmitter and receiver.

Figure 6:
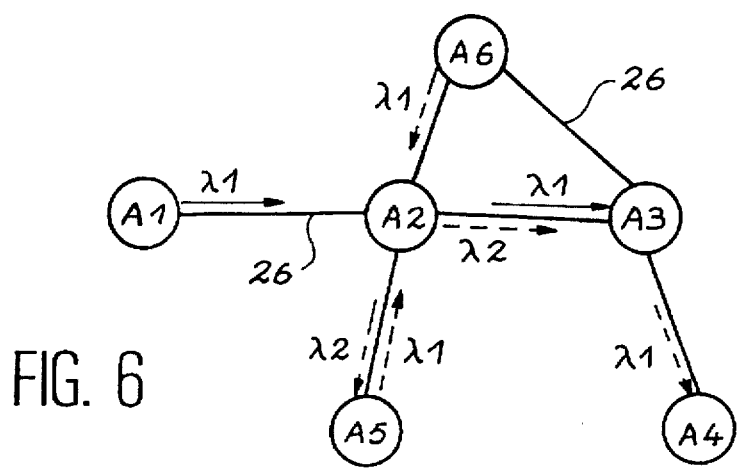

FIG. 6 diagrammatically shows another optical telecommunications network constituting a lattice network.

This network includes six nodes A1 to A6.

FIG. 6 also shows the links (optical fibers) referenced 26 and able to connect the nodes to one another.

It can be seen that the node A1 is connected by such a link to the node A2 which itself is connected to the node A3, A5 and A6 by these links.

The node A3 is connected to the node A6 and to node A4.

For communication between the various nodes of the network, a set of wavelengths λ1 to λN is used and when two nodes wish to communicate, and suitable wavelengths are allocated to the links making it possible to move from one node to another.

Hereafter, an algorithm is indicated making it possible to allocate wavelengths to a transmission between two nodes Ai and Aj of the network where i and j are in the example in question selected from the numbers 1 to 6, i being different from j.

Figure 7:
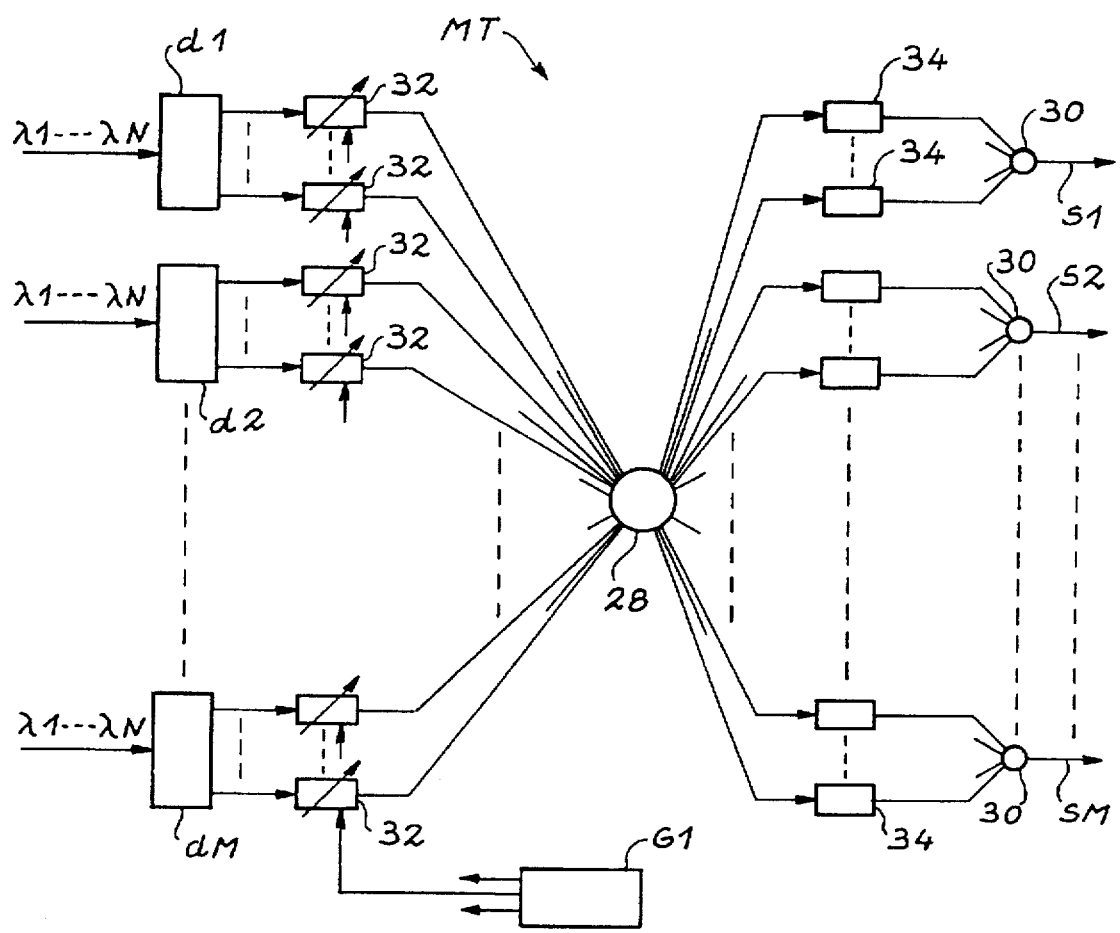
FIG. 7 is a diagrammatic view of a second particular embodiment of the fully optical crossconnect of the present invention.

The lattice network of FIG. 6 also comprises management means (not shown) on FIG. 6 but bearing the reference G1 on FIG. 7.

When these management means are informed of a communication to be established between the nodes Ai and Aj, they determine a physical path between these nodes Ai and Aj and allocate wavelengths to the various links of this path.

The wavelengths are allocated with the following algorithm:

For each link Ap–Ap+1, p ranging from 0 to K–1 with A0=Ai and AK=Aj, the value 1 is given to an index k, if λk is already used on the path, k is replaced by k+1; otherwise, λk is allocated to the link the preceding line is returned to until a wavelength is allocated to the link.

An example for applying this algorithm is shown in FIG. 6 and tow wavelengths λ1 and λ2 are used.

For a communication from the node A1 to the node A3, one moves from the node A1 to the node A2 with the wavelength M and from the node A2 to the node A3 with this wavelength λ1.

For a communication from the node A5 to the node A4, one moves from the node A5 to the node A2 with the wavelength M, from the node A2 to the node A3 with the wavelength λ2 and from the node A3 to the node A4 with the wavelength λ1.

For a communication from the node A6 to the node A5, one moves from the node A6 to the node A2 with the wavelength λ1 and from the node A2 to the node A5 with the wavelength λ2.

So as to establish these various communications, optical crossconnects conforming to the invention are used and being of the type diagrammatically shown in FIG. 7.

A optical crossconnect of this type is placed in each of the nodes of the lattice network which results in 6 optical crossconnects in the case of FIG. 6.

As shall be seen more clearly subsequently, this optical crossconnect includes elements (optical filters or shifters) which are wavelength-tunable.

The management means G1 of the network are then provided so as to suitably control these tunable elements so as to establish the desired communications between the nodes of the network.

Each node is provided with an information transmitter and an information receiver (not shown on FIG. 6).

The optical crossconnect of the invention diagrammatically shown in FIG. 7 is intended to be placed in a node of a lattice network, this node being provided with M-1 links which connect it to M-1 other nodes of the lattice network.

In the example of FIG. 6, the number M is equal to 5 for the node A2 of the network.

The optical crossconnect of FIG. 7 includes M demultiplexers with wavelengths d1, d2, . . . , dM, each demultiplexer having one input and N output channels.

The inputs of the demultiplexers d1, d2, . . . , dm-1 are respectively connected to the links ending at the node in which this optical crossconnect is located.

These inputs receive optical signals whose wavelengths are selected from the set of wavelengths λ1 to λN.

On its output channels, each demultiplexer furnishes demultiplexed optical signals.

The channel number 1 of this demultiplexer provides a signal on the wavelength λ1, the channel number 2 a signal on the wavelength λ2 . . . and the channel number N a signal on the wavelength λN.

These demultiplexers can be embodied with the aid of optical couplers and optical filters, as seen earlier in the case of FIG. 4.

The input of the demultiplexer dM is reserved for inserting information derived from the node containing the optical crossconnect.

The optical crossconnect of FIG. 7 also includes:

an optical coupler 28 with M×N inputs and M×N outputs,

M output optical couplers 30 with N inputs and one output,

M×N fully optical tunable shifters 32, and

M×N fixed optical filters 34.

Each of the shifters 32 is controlled by management means G1 and able to transform the wavelength of an incident optical signal into a wavelength selected from the wavelengths λ1 to λN.

The respective outputs S1, S2, . . . , SM of the optical couplers 30 constitute the M outputs of the optical crossconnect of FIG. 7.

The outputs S1, S2, . . . , SM-1 are respectively optically connected by means (not shown) to the links which connect the node containing the optical crossconnect to the M-1 other nodes.

The output SM is reserved for extraction of the information intended for this node.

As can be seen in FIG. 7, the inputs of the main optical coupler 28 are respectively connected to the M×N output channels of the various multiplexers d1 to dM by means of the M×N tunable shifters 32.

As can also be seen in FIG. 7, the N inputs of each optical coupler 30 are respectively connected to N outputs of the main optical coupler 28 by means of N fixed optical filters 34.

The N fixed optical filters associated with each coupler 30 only allow the wavelengths λ1 to λN respectively to pass.

In the example of FIG. 7, the desired wavelengths on the various outputs of the optical crossconnect are selected by tuning the shifters 32.

As a variant, another optical crossconnect conforming to the invention is obtained by replacing the shifters 32 by fixed shifters and the optical filters 34 by wavelength-tunable optical filters.

In this other optical crossconnect, the N shifters associated with each demultiplexer convert the wavelength of an incident signal into the wavelengths λ1 to λN respectively.

Moreover, in this other optical crossconnect, each of the optical filters is tunable so as to select a desired wavelength from the wavelengths λ1 to λN and this filter is of course controlled by the management means of the network.

These management means select the desired wavelengths on the various outputs of this other optical crossconnect by tuning these tunable filters.

It can be seen that the optical crossconnects of the type of that of FIG. 7 placed in the nodes of the lattice network effectively make it possible to use the algorithm mentioned earlier.

Optical crossconnects of the type of FIG. 7 (or of the variant of the latter) enable a lattice network to be dynamically managed.

But these optical crossconnects also make it possible to configure a lattice network at moments separated by extensive time intervals before the period of the messages to be transmitted by this network.

Fully optical crossconnects are then obtained which are transparent to the signals used (SDH type signals, that is <<Synchronous Digital Hierarchy>> signals or plesiochronous signals, for example).

What is claimed is:

1. Optical crossconnect, wherein it includes:

M wavelength demultiplexing optical means, M being a whole number equal at least to 2, each optical demultiplexing device having firstly one input for receiving optical input signals whose wavelengths are distinct from one another and selected from a first group of N wavelengths distinct from one another, N being a whole number equal at least to 2, and secondly N output channels, this demultiplexing device being able to provide on these output channels the demultiplexed optical signals, means for optically processing these demultiplexer optical signals, said means including optical coupling means, a first set of optical filtering means; a second set of fully optical wavelength conversion means and a plurality of outputs, the means of at least one of the first and second sets being wavelength-tunable, and management means provided to control the wavelength-tunable means, and wherein the optical coupling means, the first set of optical filtering means and the second set of wavelength conversion means are provided to give each optical input signal a specific wavelength selected from a second group of N wavelengths distinct from one another and bring to one of the outputs this optical input signal with this specific wavelength under the control of the management means.

2. Optical crossconnect comprising:

M wavelength demultiplexing optical means, M being a whole number equal at least to 2, each optical demultiplexing device having firstly one input for receiving optical input signals whose wavelengths are distinct from one another and selected from a first group of N wavelengths distinct from one another, N being a whole number equal at least to 2, and secondly output channels, this demultiplexing device being able to provide on these output channels the demultiplexed optical signals, means for optically processing these demultiplexed optical signals, said means including optical coupling means, a first set of optical filtering means, a second set of fully optical wavelength conversion means and a plurality of outputs, the means of at least one of the first and second sets being wavelength-tunable, and management means provided to control the wavelength-tunable means, and wherein the optical coupling means, the first set of optical filtering means and the second set of wavelength conversion means are provided to give each optical input signal a specific wavelength selected from a second group of N wavelengths distinct from one another and bring to one of the outputs this optical input signal with this specific wavelength under the control of the management means, wherein the optical processing means include N optical processing sets, wherein each optical processing set includes one main optical coupler with M inputs and M outputs, M auxiliary optical couplers, each including one input and M outputs, M optical output couplers associated respectively with said M auxiliary optical couplers and each including M inputs and one output, and M optical filters and M×M wavelength converters, at least the optical filters being wavelength-tunable, wherein in the optical processing set of row p for any number p ranging from 1 to N, the input of row i of the main coupler for any number i ranging from 1 to M is connected to the output channel of row j of the demultiplexing device of row i where the number j cyclically traverses all the numbers 1 to M from the number p, wherein the outputs of the main coupler are respectively connected to the inputs of the auxiliary couplers and wherein each output of each auxiliary coupler is connected to one input of the associated output coupler by means of one of the optical filters followed by one of the wavelength converters.

3. Optical crossconnect according to claim 2, wherein each wavelength converter is able to convert into a fixed wavelength the wavelength of an incident optical signal, this fixed wavelength being selected from the second group of N wavelengths.

4. Optical crossconnect according to claim 2, wherein each wavelength converter is wavelength-tunable and able to convert the wavelength of an incident optical signal into any one of the wavelengths of the second group of N wavelengths.

5. Optical crossconnect according to claim 2, wherein the first and second groups of N wavelengths are identical.

6. Optical crossconnect according to claim 2, wherein the wavelengths of the second group of N wavelengths are different from the wavelengths of the first group of N wavelengths.

7. Optical crossconnect comprising:

M wavelength demultiplexing optical means, M being a whole number equal at least to 2, each optical demultiplexing device having firstly one input for receiving optical input signals whose wavelengths are distinct from one another and selected from a first group of N wavelengths distinct from one another, N being a whole number equal at least to 2, and secondly output channels, this demultiplexing device being able to provide on these output channels the demultiplexed optical signals, means for optically processing these demultiplexed optical signals, said means including optical coupling means, a first set of optical filtering means, a second set of fully optical wavelength conversion means and a plurality of outputs, the means of at least one of the first and second sets being wavelength-tunable, and management means provided to control the wavelength-tunable means, and wherein the optical coupling means, the first set of optical filtering means and the second set of wavelength conversion means are provided to give each optical input signal a specific wavelength selected from a second group of N wavelengths distinct from one another and bring to one of the outputs this optical input signal with this specific wavelength under the control of the management means, wherein the optical coupling means include a main optical coupler with M×N inputs and M×N outputs and M optical output couplers with N inputs and one output, wherein the number of the optical filtering means is M×N and said optical filtering means respectively connect the outputs of the main optical coupler to the inputs of the optical output couplers, the outputs of the latter constituting the outputs of the optical processing means, and wherein the number of the wavelength conversion means is M×N and wavelength conversion means respectively connect the output channels of the demultiplexing means to the inputs of the main optical coupler.

8. Optical crossconnect according to claim 7, wherein the wavelength conversion means are wavelength-tunable and wherein the optical filtering means are fixed.

9. Optical crossconnect according to claim 7, wherein the wavelength conversion means are fixed and wherein the optical filtering means are wavelength-tunable.

* * * * *